United States Patent
Hou et al.

(10) Patent No.: US 11,115,073 B2
(45) Date of Patent: Sep. 7, 2021

(54) METHOD AND DEVICE FOR DECREASING ELECTROMAGNETIC RADIATION SPECIFIC ABSORPTION RATE

(71) Applicant: Huawei Technologies Co., Ltd., Shenzhen (CN)

(72) Inventors: Meng Hou, Shanghai (CN); Hai Zhou, Reading (GB)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 0 days.

(21) Appl. No.: 17/040,357

(22) PCT Filed: Apr. 20, 2018

(86) PCT No.: PCT/CN2018/083961
§ 371 (c)(1),
(2) Date: Sep. 22, 2020

(87) PCT Pub. No.: WO2019/200613
PCT Pub. Date: Oct. 24, 2019

(65) Prior Publication Data
US 2021/0058104 A1   Feb. 25, 2021

(51) Int. Cl.
*H04W 52/02* (2009.01)
*H04B 1/3827* (2015.01)
*H04W 52/36* (2009.01)

(52) U.S. Cl.
CPC ...... *H04B 1/3838* (2013.01); *H04W 52/0261* (2013.01); *H04W 52/367* (2013.01)

(58) Field of Classification Search
CPC ............................ H04B 1/3838; H04B 17/102
See application file for complete search history.

(56) References Cited

U.S. PATENT DOCUMENTS

| | | | |
|---|---|---|---|
| 8,565,205 B2 | 10/2013 | Ho et al. | |
| 9,054,780 B2 | 6/2015 | Wilson et al. | |
| 9,237,531 B2 | 1/2016 | Lu et al. | |
| 9,622,187 B2 | 4/2017 | Logan et al. | |
| 2002/0077147 A1 | 6/2002 | Ito | |
| 2007/0111681 A1 | 5/2007 | Alberth et al. | |
| 2011/0034135 A1 | 2/2011 | Ali et al. | |
| 2011/0222469 A1 | 9/2011 | Ali et al. | |
| 2012/0021800 A1* | 1/2012 | Wilson | H04B 1/3838 455/550.1 |
| 2012/0091195 A1 | 4/2012 | Gehrich et al. | |

(Continued)

FOREIGN PATENT DOCUMENTS

| CN | 1343058 A | 4/2002 |
|---|---|---|
| CN | 201117791 Y | 9/2008 |

(Continued)

*Primary Examiner* — Keith Ferguson
(74) *Attorney, Agent, or Firm* — Conley Rose, P.C.

(57) ABSTRACT

A method includes separately collecting, by a terminal, a transmit power of the terminal at different time points in a second duration after a first duration from a power-on moment to obtain a plurality of transmit powers, calculating an average transmit power of the transmit powers, determining based on the average transmit power, a specific absorption rate (SAR) corresponding to the average transmit power, and decreasing a transmit power of the terminal after the second duration when the terminal determines that the SAR is greater than a preset threshold.

20 Claims, 4 Drawing Sheets

(56) References Cited

U.S. PATENT DOCUMENTS

| | | |
|---|---|---|
| 2012/0213172 A1 | 8/2012 | Kim et al. |
| 2013/0122827 A1 | 5/2013 | Ali et al. |
| 2014/0018728 A1 | 1/2014 | Plahey et al. |
| 2014/0027419 A1 | 1/2014 | Zeygerman |
| 2014/0370929 A1 | 12/2014 | Khawand et al. |
| 2017/0064641 A1 | 3/2017 | Logan et al. |
| 2018/0199214 A1 | 7/2018 | Shen |

FOREIGN PATENT DOCUMENTS

| | | |
|---|---|---|
| CN | 102835036 A | 12/2012 |
| CN | 103139891 A | 6/2013 |
| CN | 106304142 A | 1/2017 |
| CN | 106332132 A | 1/2017 |
| CN | 106657565 A | 5/2017 |
| CN | 106686238 A | 5/2017 |
| CN | 106788530 A | 5/2017 |
| CN | 106900051 A | 6/2017 |
| CN | 107172702 A | 9/2017 |
| CN | 107277909 A | 10/2017 |
| EP | 2410661 A1 | 1/2012 |
| EP | 3282811 A1 | 2/2018 |
| WO | 2016053229 A1 | 4/2016 |
| WO | 2017034735 A1 | 3/2017 |
| WO | 2017190232 A1 | 11/2017 |

\* cited by examiner

METHOD AND DEVICE FOR DECREASING ELECTROMAGNETIC RADIATION SPECIFIC ABSORPTION RATE

CROSS-REFERENCE TO RELATED APPLICATIONS

This application is a U.S. National Stage of International Patent Application No. PCT/CN2018/083961 filed on Apr. 20, 2018, which is hereby incorporated by reference in its entirety.

TECHNICAL FIELD

This application relates to the field of communications technologies, and in particular, to a method and a device for decreasing an electromagnetic radiation specific absorption rate.

BACKGROUND

Development of wireless communications technologies results in a sharp increase of devices capable of transmitting an electromagnetic wave. The public are increasingly more concerned with a security issue. Although energy of an electromagnetic wave transmitted by a working mobile terminal, such as a mobile phone or a tablet computer is comparatively low, when the working mobile terminal is close to a human body, an induced electromagnetic field is generated in the human body. Currently, an electromagnetic radiation specific absorption rate (specific absorption rate, SAR) is introduced in the industry to indicate how electromagnetic radiation affects the human body. The SAR is defined as an electromagnetic power absorbed or consumed by a human body per unit time and per unit mass. In an actual application, the SAR is a measurement value in a unit of W/kg. A larger SAR value indicates greater impact on the human body. Otherwise, a smaller SAR value indicates less impact on the human body. An excessively large SAR value may be harmful to the human body, and therefore many countries and regions stipulates an SAR limit value. The limit value is specified as 2.0 W/kg in Europe, and the limit value is specified as 1.6 W/kg in Americas.

In the prior art, before the mobile terminal is delivered from a factory, a method of adding a shielding component (such as conductive foam, a wave-absorbing material, a conductor reflector, or a shielding device) between an antenna and the human body is usually used to decrease the SAR. In this way, because the SAR can be decreased only when the mobile terminal is produced, once the mobile terminal is used after delivery, the SAR cannot be dynamically decreased. Therefore, the method has comparatively poor flexibility, and larger position space is required in an assembly process of the shielding component, which does not facilitate miniaturization design of the mobile terminal.

Therefore, a new method is required to decrease the SAR.

SUMMARY

Embodiments of this application provide a method and a device for decreasing an electromagnetic radiation specific absorption rate, to resolve a problem that an existing method for decreasing an SAR has comparatively poor flexibility and does not facilitate miniaturization design of a mobile terminal.

According to a first aspect, an embodiment of this application provides a method for decreasing an electromagnetic radiation specific absorption rate. The method includes: separately collecting, by a terminal, a transmit power of the terminal at different time points in second duration after first duration from a power-on moment, to obtain at least two transmit powers; calculating an average transmit power of the at least two transmit powers; determining based on the average transmit power, an SAR corresponding to the average transmit power; and if the terminal determines that the SAR is greater than a preset threshold, decreasing a transmit power of the terminal after the second duration.

According to the method, the terminal may collect statistics on the average transmit power in the second duration after the first duration from the power-on moment, determine based on a correspondence between the average transmit power and the SAR, the SAR corresponding to the average transmit power, and when determining that the SAR is greater than the preset threshold, decrease the transmit power of the terminal after the second duration, to decrease an SAR value. In this way, in a process of using the terminal, the SAR value can be dynamically adjusted, flexibility is comparatively high, and miniaturization design of the terminal can be supported without requiring to add a shielding component between an antenna and a human body when the terminal is produced. Further, because the terminal usually does not enter a call state immediately after being powered on, the terminal usually has a comparatively low transmit power in short duration after being powered on. In this application, the terminal collects statistics on the transmit power of the terminal after the first duration from the power-on moment, to better decrease power consumption of the terminal.

In a possible design, the first duration may be empirical duration in which the terminal usually enters the call state or a working state, for example, 5 seconds. In this design, the terminal starts to collect and control power only after entering the call state, and further adjusts a SAR size, to further decrease the power consumption of the terminal.

In a possible design, the terminal may decrease the transmit power of the terminal after the second duration in, but not limited to, at least one of the following manners:

disabling, by the terminal, a wireless broadband (wireless-fidelity, Wi-Fi) function;

forbidding, by the terminal, establishing a new radio resource control (radio resource control, RRC) connection and/or an application communication connection, where the application communication connection indicates a communication connection performed by using an application program, and the application communication connection includes an application voice connection, an application data connection, and an application video connection;

controlling, by the terminal, a phased-array antenna of the terminal to form a beam that does not point to a human body; and controlling, by the terminal, to transmit a signal by using an antenna that is far away from the human body and that is in a plurality of antennas installed on the terminal.

According to the method, if the terminal cannot decrease the transmit power of the terminal to a proper value in one of the manners, the terminal can decrease the transmit power of the terminal simultaneously in a plurality of manners. In this way, the terminal can flexibly select an implementation for decreasing the transmit power, and the flexibility is comparatively high.

In a possible design, the decreasing a transmit power of the terminal after the second duration if the terminal determines that the SAR is greater than a preset threshold may include: calculating, by the terminal, a difference between the preset threshold and the SAR, and further determining based on the difference, to decrease the transmit power after the second duration by a specified value; and decreasing the transmit power after the second duration by the specified value.

According to the method, the terminal may further determine the difference between the preset threshold and the SAR. In this way, the terminal may accurately determine based on the difference, the specified value by which the transmit power needs to be decreased, and further decrease the transmit power by the specified value, to accurately adjust the SAR value.

In a possible design, the terminal may decrease the transmit power after the second duration by the specified value in, but not limited to, the following manner:

decreasing, by the terminal, a maximum transmit power of a physical random access channel (physical random access channel, PRACH) by a first preset value;

decreasing, by the terminal, power headroom reported to a network by a second preset value;

increasing, by the terminal, a quantity of uplink hybrid automatic repeat request (hybrid automatic repeat request, HARQ) times by a third preset value;

decreasing, by the terminal, a total quantity of connections to a network device during soft handover by a fourth preset value; or decreasing, by the terminal, a codec data rate of a voice connection by a fifth preset value.

According to the method, the terminal can flexibly select an implementation to decrease the transmit power, the flexibility is comparatively high, and the terminal decreases the transmit power of the terminal by the specified value, to accurately adjust the SAR value. It should be noted that the plurality of manners used to decrease the transmit power after the second duration by the specified value may be used simultaneously. In this way, a sum of values by which the transmit power is decreased in each manner is a total value by which the transmit power is decreased by the terminal.

In a possible design, the terminal may determine, based on the average transmit power, the SAR corresponding to the average transmit power in the following manner: obtaining, by the terminal, one-to-one correspondences between at least two average transmit powers and at least two SARs, and determining based on the correspondence and the average transmit power, the SAR corresponding to the average transmit power. Therefore, the terminal may quickly determine, based on the obtained one-to-one correspondences between the at least two average transmit powers and the at least two SARs and the average transmit power obtained through calculation, the SAR corresponding to the average transmit power obtained through calculation.

In a possible design, the terminal may receive the one-to-one correspondences that are between the at least two average transmit powers and the at least two SARs and that are sent by the network device, and certainly, the terminal may also obtain the locally prestored one-to-one correspondences between the at least two average transmit powers and the at least two SARs. According to the method, the terminal may obtain the prestored correspondence. In this way, the one-to-one correspondences between the at least two average transmit powers and the at least two SARs are locally prestored in the terminal, to further improve efficiency of controlling the transmit power.

According to a second aspect, an embodiment of this application provides a device for decreasing an electromagnetic radiation specific absorption rate. The device has a function of implementing the terminal in the method in the first aspect, and the function may be implemented by hardware, or may be implemented by hardware by executing corresponding software. The hardware or the software includes one or more modules corresponding to the foregoing function. The module may be software and/or hardware.

In a possible design, the terminal includes a transceiver unit, a processing unit, and a storage unit. These units may perform the method in the first aspect or any possible design of the first aspect. For details, refer to detailed descriptions in the method example. Details are not described herein again.

In a possible design, the terminal includes a processor, a memory, a transceiver, and a bus. The processor, the memory, and the transceiver are connected by using the bus. The processor invokes an instruction stored in the memory, to perform the method in the first aspect or any possible design of the first aspect.

According to a third aspect, an embodiment of this application further provides a computer storage medium. The computer storage medium stores a computer-executable instruction, and when the computer-executable instruction is invoked by a computer, the computer is enabled to perform the method in the first aspect or any possible design of the first aspect.

According to a fourth aspect, an embodiment of this application further provides a computer program product. The computer program product stores an instruction, and when the instruction is run on a computer, the computer is enabled to perform the method in the first aspect or any possible design of the first aspect.

DESCRIPTION OF EMBODIMENTS

To make the objectives, technical solutions, and advantages of this application clearer, the following further describes the embodiments of this application in detail with reference to the accompanying drawings.

Some terms in this application are first described, so as to help a person skilled in the art has a better understanding.

(1) A terminal is also referred to as user equipment (User Equipment, UE), a mobile station (mobile station, MS), a mobile terminal (mobile terminal, MT), or the like, and is a device that provides voice connectivity and/or data connectivity for a user and has a network access function, for example, a handheld device or a vehicle-mounted device that has a wireless connection function. Currently, examples of some terminals are: a mobile phone (mobile phone), a tablet computer, a notebook computer, a palmtop computer, a mobile internet device (mobile internet device, MID), a wearable device, a virtual reality (virtual reality, VR) device, an augmented reality (augmented reality, AR) device, a wireless terminal in industrial control (industrial control), a wireless terminal in self driving (self driving), a wireless terminal in a remote medical surgery (remote medical surgery), a wireless terminal in a smart grid (smart grid), a wireless terminal in transportation safety (transportation safety), a wireless terminal in a smart city (smart city), a wireless terminal in a smart home (smart home), or the like.

(2) A network device is a device in a wireless network, for example, may be a radio access network (radio access network, RAN) node that enables a terminal to access the wireless network, and the RAN node may also be referred to as a base station. Currently, examples of some RAN nodes are: a continuously evolved NodeB (gNB), a transmission reception point (transmission reception point, TRP), an evolved NodeB (evolved NodeB, eNB), a radio network controller (radio network controller, RNC), a NodeB (NodeB, NB), a base station controller (base station controller, BSC), a base transceiver station (base transceiver station, BTS), a home evolved NodeB (for example, a home evolved NodeB or a home NodeB, HNB), a baseband unit (base band unit, BBU), a wireless fidelity (wireless fidelity, Wi-Fi) access point (access point, AP), or the like. In a network structure, the network device may include a centralized unit (centralized unit, CU) node, a distributed unit (distributed unit, DU) node, or a RAN device including a CU node and a DU node.

(3) "A plurality of" indicates two or more, and another quantifier is similar to this. The term "and/or" describes an association relationship for describing associated objects and represents that three relationships may exist. For example, A and/or B may represent the following three cases: Only A exists, both A and B exist, and only B exists. The character "/" generally indicates an "or" relationship between the associated objects.

(4). An SAR indicates an electromagnetic power absorbed or consumed by a human body organization per unit time and per unit mass, is in a unit of W/kg, and is used to indicate how an impact degree of electromagnetic radiation affects a human body. A larger SAR value indicates greater impact on the human body. Otherwise, a smaller SAR value indicates less impact on the human body.

(5) Wi-Fi is a technology that allows direct communication or communication under coordination of a base station/an access point (access point, AP) between terminals.

(6) A phased-array antenna indicates an antenna whose directional pattern shape is changed by controlling a feed phase of a radiating element in an array antenna.

(7) Power headroom indicates a difference between a maximum transmit power allowed by a terminal and a current transmit power that is of a physical uplink shared channel (physical uplink shared channel, PUSCH) and that is obtained through evaluation.

(8) Soft handover indicates channel handover between cells when a carrier frequency of a pilot channel is the same. In a handover process, a terminal maintains a communication link with both an original base station and a new base station. The terminal disconnects from the original base station only after establishing stable communication in a new cell.

Figure 1:
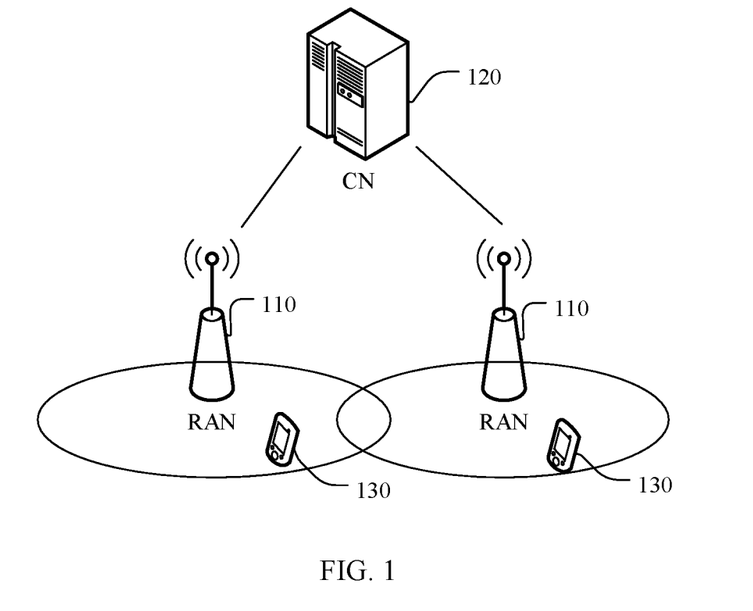
FIG. 1 is a schematic diagram of a communications system according to an embodiment of this application.

FIG. 1 is a schematic diagram of a communications system according to an embodiment of this application. As shown in FIG. 1, a terminal 130 accesses a wireless network, to obtain a service from an external network (for example, an internet) over the wireless network or communicate with another terminal over the wireless network. The wireless network includes a radio access network (radio access network, RAN) node 110 and a core network (CN) 120. The RAN 110 is configured to access the wireless network by the terminal 130, and the CN 120 is configured to manage the terminal and provide a gateway for communicating with the external network.

Figure 2:
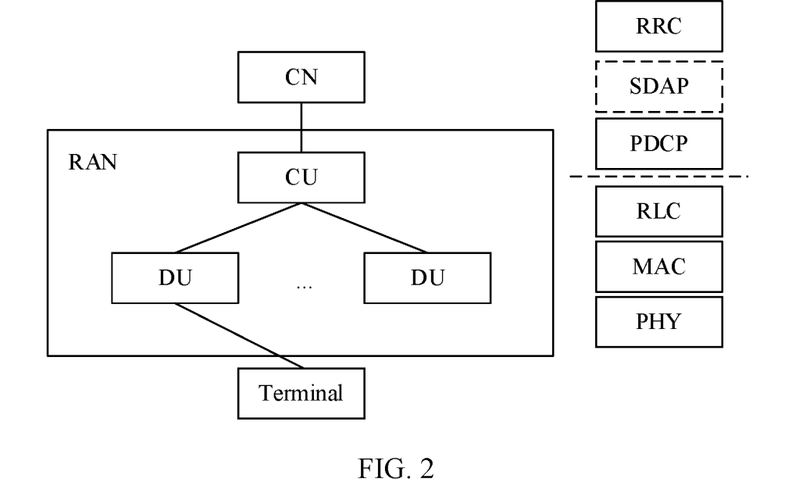
FIG. 2 is a schematic diagram of a network architecture according to an embodiment of this application.

FIG. 2 is a schematic diagram of a network architecture according to an embodiment of this application. As shown in FIG. 2, the network architecture includes a CN device and a RAN device. The RAN device includes a baseband apparatus and a radio frequency apparatus. The baseband apparatus may be implemented by one node, or may be implemented by a plurality of nodes. The radio frequency apparatus may be independently implemented remotely from the baseband apparatus remote, may be integrated into the baseband apparatus, or some remote parts are integrated into the baseband apparatus. For example, in a long term evolution (long term evolution, LTE) communications system, the RAN device (evolved NodeB (evolved NodeB, eNB)) includes the baseband apparatus and the radio frequency apparatus, and the radio frequency apparatus may be disposed remotely relative to the baseband apparatus, for example, a remote radio unit (remote radio unit, RRU) is remotely disposed relative to a baseband unit (base band unit, BBU).

Communication between the RAN device and a terminal complies with a specified protocol layer structure. For example, a control plane protocol layer structure may include functions of protocol layers such as a radio resource control (radio resource control, RRC) layer, a packet data convergence protocol (packet data convergence protocol, PDCP) layer, a radio link control (radio link control, RLC) layer, a media access control (media access control, MAC) layer, and a physical layer. A user plane protocol layer structure may include functions of protocol layers such as the PDCP layer, the RLC layer, the MAC layer, and the physical layer. In an implementation, a service data adaptation (service data adaptation protocol, SDAP) layer is further included above the PDCP layer.

The RAN device may implement the functions of the protocol layers such as the RRC, the PDCP, the RLC, and the MAC by using one node, or may implement the functions of these protocol layers by using a plurality of nodes. For example, in an evolved structure, the RAN device may include a centralized unit (centralized unit, CU), and a distributed unit (distributed unit, DU), and a plurality of DUs may be centrally controlled by one CU. As shown in FIG. 2, the CU and the DU may be divided based on a protocol layer of a wireless network. For example, functions of the PDCP layer and a protocol layer above the PDCP layer are set on the CU, and functions of protocol layers below the PDCP, such as the RLC layer and the MAC layer, are set on the DU.

The division into the protocol layer is merely an example, and division may alternatively be performed at another protocol layer, for example, at the RLC layer. Functions of the RLC layer and a layer above the RLC layer are set on the CU, and functions of protocol layers below the RLC layer are set on the DU. Alternatively, division is performed at a protocol layer. For example, some functions of the RLC layer and a function of a protocol layer above the RLC layer are set on the CU, and remaining functions of the RLC layer and a function of a protocol layer below the RLC layer are set on the DU. In addition, division may alternatively be performed in another manner, for example, performed based on a latency. A function whose processing time needs to meet a latency requirement is set on the DU, and a function whose processing time does not need to meet the latency requirement is set on the CU.

In addition, the radio frequency apparatus may not be placed in the DU and is placed remotely from the DU, may be integrated into the DU, or some of the radio frequency apparatus is disposed remotely from the DU, and the other is integrated into the DU. This is not limited herein.

In the network architecture shown in FIG. 1 or FIG. 2, when communication is performed between the terminals or between the terminal and the RAN, the terminal transmits an electromagnetic wave, and carries, by using the electromagnetic wave, a message that needs to be sent to the other terminal or the RAN. Although energy of the electromagnetic wave transmitted by the working terminal is comparatively low, if the working terminal is very close to a human body, an induced electromagnetic field is generated in a human body, and the induced electromagnetic field has harmful impact on the human body. Currently, an SAR is used in the industry to measure an impact degree of electromagnetic radiation on the human body. A larger SAR value indicates greater impact on the human body. Otherwise, a smaller SAR value indicates less impact on the human body. Therefore, how to decrease the SAR and further decrease the impact of the electromagnetic radiation generated by the terminal on the human body is a problem of increasing concern of the public.

In the prior art, before the terminal is delivered from a factory, a method of adding a shielding component between an antenna and the human body, for example, to add conductive foam, a wave-absorbing material, a conductor reflector, or a shielding device between the antenna and the human body is usually used to decrease the SAR. In this way, because the SAR can be decreased only when the terminal is produced, once the terminal is used after delivery, the SAR cannot be dynamically decreased. Therefore, the method has comparatively poor flexibility, and larger position space is required in an assembly process of the shielding component, which also violates an original intention of miniaturization design of the terminal.

Based on the existed problem, embodiments of this application provide a method for decreasing an electromagnetic radiation specific absorption rate. A terminal can dynamically collect statistics on an average transmit power within preset duration, further determine, based on a correspondence between the average transmit power and an SAR, an SAR corresponding to the average transmit power, and when determining that the SAR is greater than a preset threshold, decrease a transmit power of the terminal, to decrease an SAR value. Therefore, in a process of using the terminal, the SAR value can be dynamically adjusted, flexibility is comparatively high, and the miniaturization design of the terminal can be supported without requiring to add the shielding component between the antenna and the human body when the terminal is produced.

Figure 3:
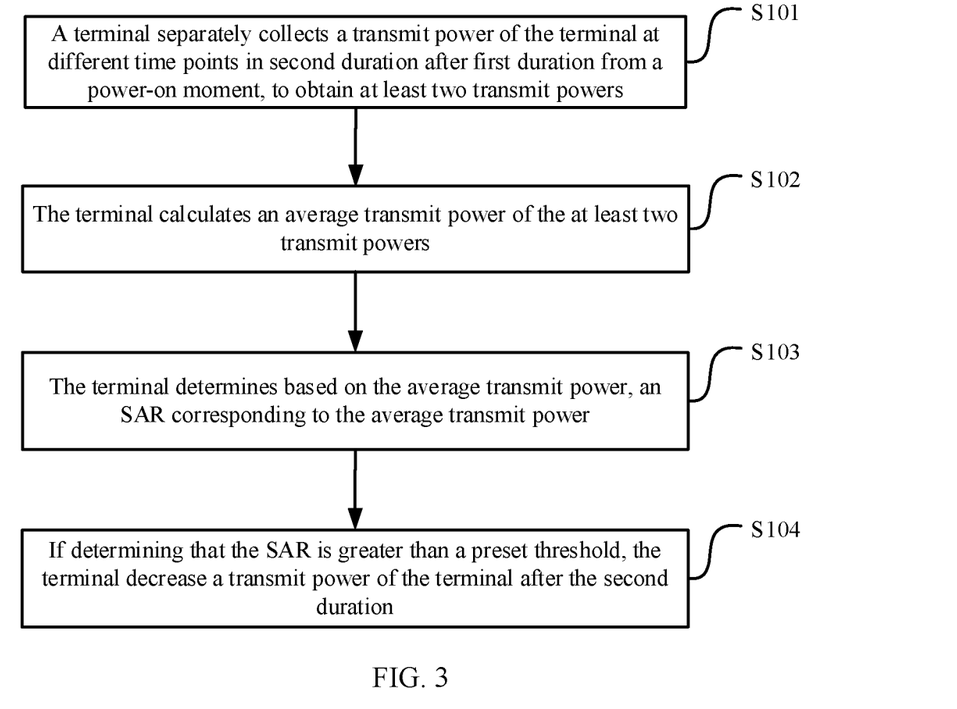
FIG. 3 is an implementation flowchart of a method for decreasing an electromagnetic radiation specific absorption rate according to an embodiment of this application.

FIG. 3 is an implementation flowchart of a method for decreasing an electromagnetic radiation specific absorption rate according to an embodiment of this application. As shown in FIG. 3, the method may include the following steps.

S101: A terminal separately collects a transmit power of the terminal at different time points in second duration after first duration from a power-on moment, to obtain at least two transmit powers.

For example, it is assumed that the terminal is powered on at the moment t0, the first duration is $\Delta t1$, and the second duration is $\Delta t2$. In step S101, based on a predetermined collection frequency, the terminal separately collects at different time points in $\Delta t2$ after the moment $t0+\Delta t1$, the transmit power that is used by a radio frequency part of the terminal to send a wireless signal, to obtain a plurality of transmit powers. It may be understood that the plurality of transmit powers are related to a quantity of collection time points (namely, collection frequencies) of the terminal in $\Delta t2$. A larger quantity of collection time points (namely, a higher collection frequency) corresponds to a larger collected transmit power value. Otherwise, a smaller quantity of collection time points corresponds to a smaller collected transmit power value.

In this embodiment of this application, because the terminal usually does not enter a call state immediately after being powered on, in this application, after the first duration from the power-on moment, the terminal collects statistics on the transmit power that is used by the radio frequency part of the terminal to send the wireless signal, to better decrease power consumption of the terminal.

S102: The terminal calculates an average transmit power of the obtained plurality of transmit powers. One transmit power cannot accurately represent a transmission state of the radio frequency part of the terminal in a period of time. Therefore, in this application, the terminal can collect at least two transmit powers of the terminal at the different time points in the second duration, and calculates the average transmit power of the at least two transmit powers, to further accurately adjust an SAR value based on the average transmit power.

S103: The terminal determines, based on the average transmit power obtained through calculation, an SAR corresponding to the obtained average transmit power. In this embodiment of this application, a correspondence that is between the average transmit power and the SAR and that is of the terminal in a period of time may be obtained through experimental measurement. There is no unified standard for the correspondence in the industry, and this is not enumerated one by one in this application.

In this embodiment of this application, how the terminal determines, based on the average transmit power, the SAR corresponding to the average transmit power is not limited. In a possible implementation, the terminal may pre-obtain one-to-one correspondences between at least two average transmit powers and at least two SARs, and determine, based on the correspondence and the average transmit power, the SAR corresponding to the average transmit power. In this implementation, the terminal may obtain the one-to-one correspondences between the at least two average transmit powers and the at least two SARs in the following two manners:

In one manner, the terminal obtains the locally prestored one-to-one correspondences between the at least two average transmit powers and the at least two SARs. For example, the terminal may prestore in a local memory, the one-to-one correspondences that are between the at least two average transmit powers and the at least two SARs and that are obtained through the experimental measurement. When the terminal uses the correspondence, the terminal obtains the correspondence locally. Therefore, the terminal may quickly determine, based on the obtained correspondence and the average transmit power obtained through calculation, the SAR corresponding to the average transmit power obtained through calculation.

In the other manner, the terminal receives the one-to-one correspondences that are between the at least two average transmit powers and the at least two SARs and that are sent by a network device (for example, a RAN). In other words, the terminal may obtain the correspondence stored locally, or obtain the correspondence in another network device. In an actual application, a proper implementation may be selected based on a specific case. For example, if local storage space at the terminal is insufficient, the terminal may store the correspondence in the another network device. When the terminal needs to use the correspondence, the terminal may obtain the correspondence from the another network device. The correspondence stored in the network device may also be the one-to-one correspondences that are between the at least two average transmit powers and the at least two SARs and that are obtained through the experimental measurement.

S104: If determining that the obtained SAR is greater than a preset threshold, the terminal chooses to decrease a transmit power used by the radio frequency part of the terminal to send the wireless signal after the second duration. Therefore, the terminal can control a wireless signal transmit power of the radio frequency part at a next moment or in a next time period based on an average transmit power in a previous time period, to further dynamically control the SAR. This maintains the SAR within the preset threshold.

In this embodiment of this application, the preset threshold may indicate a current specified SAR limit value 2.0 W/kg in Europe, may be a currently specified SAR limit value 1.6 W/kg in Americas, or certainly may be another value that is less than the specified limit value in Europe or less than the specified limit value in Americas and that is determined based on an actual application scenario. This is not limited in this application.

Figure 4:
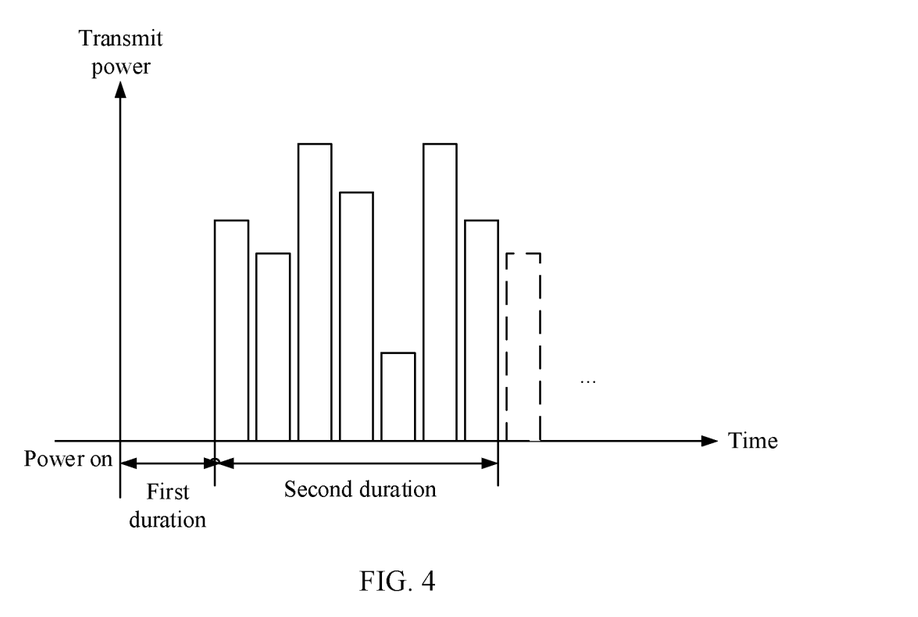
FIG. 4 is a schematic diagram of an effect of controlling a transmit power according to an embodiment of this application.

FIG. 4 is a schematic diagram of an effect of controlling a transmit power according to an embodiment of this application. As shown in FIG. 4, it is assumed that a horizontal axis of a coordinate axis represents time, a vertical axis represents a transmit power of a terminal, and the terminal is powered on at an origin. The terminal separately collects a transmit power of the terminal at seven different time points in second duration after first duration from the power-on moment, to obtain seven transmit powers. The terminal may calculate an average transmit power of the seven transmit powers, further determine based on the average transmit power, an SAR corresponding to the average transmit power, and if determining that the SAR is greater than a preset threshold, decrease a transmit power (a transmit power shown by a dashed line) after the second duration. According to the method, in a process of using the terminal, an SAR value can be dynamically adjusted, flexibility is comparatively high, and miniaturization design of the terminal can be supported without requiring to add a shielding component between an antenna and a human body when the terminal is produced. Further, because the terminal usually does not enter a call state immediately after being powered on, in this application, the terminal collects statistics on the transmit power of a radio frequency part of the terminal after the first duration from the power-on moment, to decrease power consumption of the terminal. The first duration may be a duration value, for example, 5 seconds, that is from time when the terminal is power-on to time when the terminal enters a working state and that is determined based on an empirical value.

In this design, the terminal starts power control only after entering the call state to adjust an SAR size. Because the terminal is the closest to the human body during a call and usually has a comparatively long contact time, the terminal is most harmful to the human body. Therefore, when the terminal enters the call state is determined, it is considered to control the SAR, and decrease or uncontrol the SAR of the terminal in another time. This further decreases power consumption of the terminal.

In this embodiment of this application, that the terminal enters a communication state indicates that the terminal establishes a connection to one or more other terminals, or establishes a connection to one or more network devices. The following describes in detail, by using an example in which a terminal is a mobile phone, the mobile phone enters a call state after first duration, and the method for decreasing an electromagnetic radiation specific absorption rate provided in this embodiment of this application.

Figure 5:
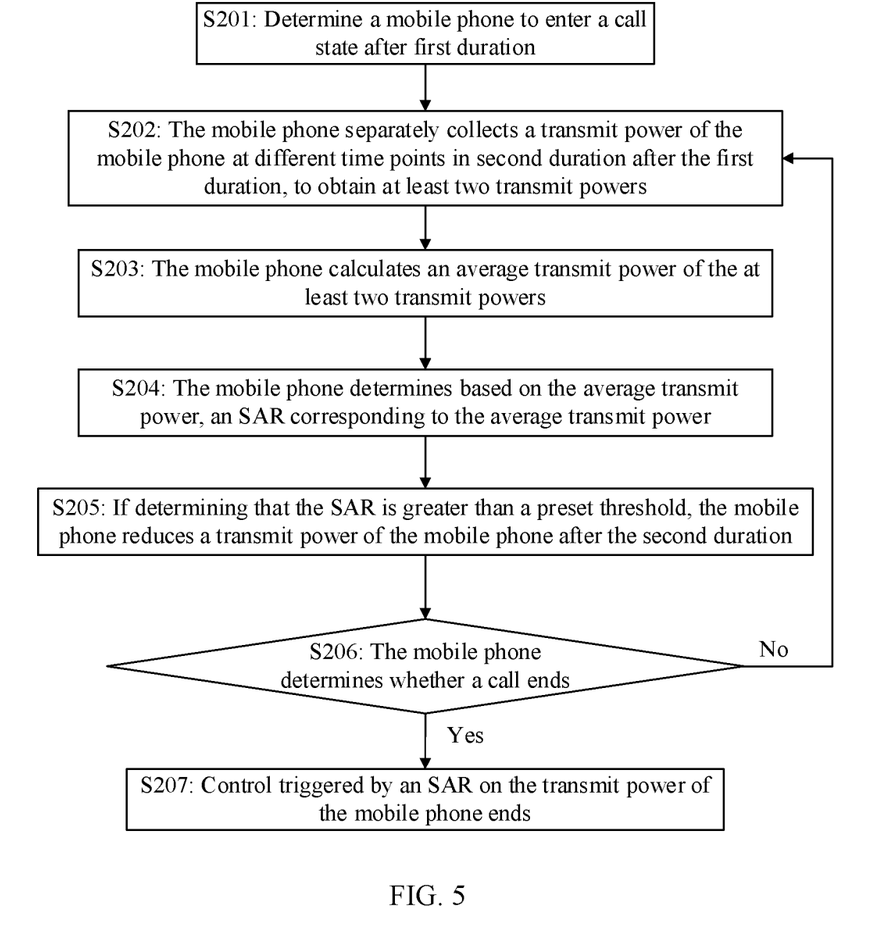
FIG. 5 is an implementation flowchart of another method for decreasing an electromagnetic radiation specific absorption rate according to an embodiment of this application.

FIG. 5 is an implementation flowchart of another method for decreasing an electromagnetic radiation specific absorption rate according to an embodiment of this application. As shown in FIG. 5, the method may include:

S201: Determine a mobile phone to enter a working state after first duration. Specifically, after the mobile phone is powered on, a processor may periodically detect whether the mobile phone enters the working state. The working state indicates that the mobile phone can normally monitor various communication signals, for example, receiving and sending a short message, and answering a call in a network. If the processor determines that the mobile phone enters a call state, the processor starts power control, to further control an SAR. The first duration is usually duration from a time when the mobile phone is powered on to a time when the mobile phone enters the working state.

S202: The mobile phone separately collects at different time points in second duration after the first duration, by using the processor, a transmit power used by a transceiver of the mobile phone to send a wireless signal, to obtain at least two transmit powers. In a possible implementation, if the processor detects that the mobile phone enters the working state after the first duration, the processor may collect, at a preset collection frequency, for example, every two milliseconds in the second duration after the first duration, the transmit power used by the transceiver of the mobile phone to send the wireless signal, to obtain a plurality of transmit powers. For example, if the second duration is one minute, the terminal collects every 20 milliseconds, the transmit power used by the transceiver of the mobile phone to send the wireless signal, to obtain 3000 transmit powers.

S203: After collecting the plurality of transmit powers, the processor of the mobile phone calculates an average transmit power of the plurality of transmit powers collected by the processor. One transmit power cannot accurately represent a state of sending the wireless signal by the transceiver of the mobile phone within a period of time. Therefore, in this application, the processor may collect at the different time points in the second duration, the plurality of transmit powers used by the transceiver to send the wireless signal, and calculate the average transmit power of the plurality of transmit powers used by the transceiver to send the wireless signal, to further accurately adjust an SAR value based on the average transmit power.

S204: The processor of the mobile phone determines, based on the average transmit power obtained through calculation, an SAR corresponding to the obtained average transmit power. The processor may determine the SAR corresponding to the obtained average transmit power in, but not limited to, the following manner:

For example, a memory inside the mobile phone prestores a plurality of correspondences between transmit powers and SARs, and the plurality of correspondences between the transmit powers and the SARs may be pre-obtained through training based on experience, may be pre-obtained through manual simulation training for a plurality of times, or certainly may be obtained through experimental measurement. Therefore, the processor may directly query, from the plurality of correspondences that are between the transmit powers and the SARs and that are stored in a local memory of the mobile phone, the SAR corresponding to the average transmit power obtained through calculation.

For another example, the processor may control the transceiver of the mobile phone to receive a plurality of correspondences that are between transmit powers and SARs and that are sent by a network device (for example, a RAN). The receiving process may be classified into an active receiving and a passive receiving. The active receiving indicates that the mobile phone may send to the network device a request message used to request a correspondence between a transmit power and an SAR, and the network device then sends the plurality of correspondences between the transmit powers and the SARs to the mobile phone based on the request message. The passive receiving indicates that the network device sends a correspondence between the newest transmit power and an SAR to the mobile phone based on a specific period without being actively requested by the mobile phone. After receiving by using the transceiver, a correspondence sent by the network device each time, the mobile phone may temporarily store the correspondence in a buffer of the mobile phone. Similarly, the plurality of correspondences that are between the transmit powers and the SARs and that are sent by the network device may further be pre-obtained through training based on experience, may be pre-obtained through manual simulation training for a plurality of times, or certainly may be obtained through experimental measurement. Then, the mobile phone may query, from the correspondence temporarily stored in the local buffer, the SAR corresponding to the average transmit power obtained through calculation.

S205: If determining that the obtained SAR is greater than a preset threshold, the processor of the mobile phone detects to decrease a transmit power used by the transceiver of the mobile phone to send the wireless signal after the second duration. The preset threshold may also be predetermined manually based on an empirical value.

S206: After the processor of the mobile phone decreases the transmit power used by the transceiver to send the wireless signal after the second duration, if the mobile phone initiates a call process within the second duration, the processor of the mobile phone may determine whether the initiated call ends when the second duration ends. If the processor of the mobile phone determines that the call ends, step S207 is performed. If the processor of the mobile phone determines that the initiated call does not end, subsequent steps of S202 and step S202 continue to be repeatedly performed.

S207: The processor of the mobile phone controlling transmit power adjustment triggered by an SAR ends.

According to the method shown in FIG. 5, the mobile phone controls the SAR only after the mobile phone is powered on and enters the working state. In a time period from time when the mobile phone is powered on to time when the mobile phone enters the working state, a transmit power of the mobile phone is very low at this time and is harmless to a human body, and therefore, the mobile phone may not start to control the SAR. This decreases power consumption of the mobile phone.

In this embodiment of this application, the terminal may decrease the transmit power of the terminal after the second duration in, but not limited to, at least one of the following manners:

Manner 1: The terminal directly disables a Wi-Fi function. Impact of Wi-Fi transmission and mobile phone communication transmission on the SAR is superimposed, and therefore the terminal may disable the Wi-Fi function to decrease the transmit power and further decrease the SAR value. In this way, the SAR value is controlled within the preset threshold range.

Manner 2: The terminal forbids establishing a new RRC connection and/or an application communication connection. More RRC connections established by the terminal require a larger transmit power. Therefore, the terminal forbids establishing the new RRC connection, to decrease the transmit power of the terminal. This further decreases the SAR value. In this embodiment of this application, the application communication connection indicates a communication connection performed by using an application program, and the application communication connection includes an application voice connection, an application data connection, and an application video connection. For example, the application program is WeChat (wechat), and the application communication connection may be the voice connection, the data connection, and the video connection initiated by using WeChat. In this way, the terminal forbids the application communication connection initiated by using the application program, to decrease the transmit power of the terminal and further decrease the SAR value.

Manner 3: The terminal controls a phased-array antenna of the terminal to form a beam that does not point to the human body. Specifically, a sensor built in the terminal may detect a position of the terminal relative to the human body, to control the phased-array antenna of the terminal to form the beam that does not point to the human body. This further decreases the SAR and radiation to the human body.

Manner 4: The terminal controls to transmit a signal by using an antenna that is far away from the human body and that is in a plurality of antennas installed on the terminal. Specifically, a current terminal is usually installed with the plurality of antennas, for example, a MIMO antenna technology. If the terminal determines that the terminal is installed with the plurality of antennas, when a user uses the terminal for communication, the terminal controls to transmit the signal by using the antenna that is far away from the human body and that is in the plurality of antennas installed on the terminal. This further decreases the SAR and the radiation to the human body.

According to the method, if the terminal cannot decrease the transmit power of the terminal to be within the preset threshold range in one of the manners, the terminal may decrease the transmit power of the terminal simultaneously in a plurality of manners. In this way, the terminal can flexibly select an implementation for decreasing the transmit power, and the flexibility is comparatively high.

In this embodiment of this application, the foregoing mainly describes the SAR reduction method in this application from a qualitative perspective. The following mainly describes in detail the SAR reduction method provided in this application from a quantitative perspective.

In a possible design, the terminal may decrease in, but not limited to, the following manner, the transmit power used by the radio frequency part of the terminal to send the wireless signal after the second duration: after determining the SAR corresponding to the average transmit power that is calculated in the second duration, the terminal calculates a difference between the preset threshold and the SAR, and determines based on the difference, to decrease the transmit power after the second duration by a specified value, and further decrease the transmit power after the second duration by the specified value. In this way, the terminal may accurately determine based on the difference, the specified value by which the transmit power needs to be decreased, and further decrease the transmit power by the specified value, to accurately adjust the SAR value.

In this embodiment of this application, the terminal may decrease in, but not limited to, one or more of the following manners, the transmit power used by the radio frequency part of the terminal to send the signal after the second duration by the specified value. When the terminal decreases the transmit power of the terminal in one of the following manners, a first preset value, a second preset value, a third preset value, a fourth preset value, and a fifth preset value in the following correspond to each of specified values by which the transmit power is decreased. When the terminal decreases the transmit power in the plurality of manners in the following manners, a sum of values by which the transmit power is decreased in each manner may be a total value by which the transmit power is decreased by the terminal. The first preset value, the second preset value, the third preset value, the fourth preset value, and the fifth preset value in the following may be determined based on an experimental measurement value, and may be prestored in a memory of the terminal.

Manner 1: The terminal decreases a maximum transmit power of a PRACH by the first preset value. For example, the terminal is a mobile phone. The maximum transmit power of the PRACH is usually close to a maximum transmit power of the mobile phone. Decreasing the maximum transmit power of the PRACH has little impact on communication performance, but can greatly decrease the SAR.

Manner 2: The terminal decreases power headroom (power headroom) reported to a network by the second preset value. The terminal may report the power headroom to a network side, so that a scheduler on the network side estimates a next-time transmit power of the terminal by using the power headroom, to further better arrange a radio resource for each terminal. Decreasing the power headroom reported by the terminal decreases a data rate of uplink transmission, and further decreases the transmit power. This decreases the SAR value.

Manner 3: The terminal increases a quantity of uplink HARQ retransmission times by the third preset value. A larger quantity of the uplink HARQ retransmission times indicates a larger quantity of times that the terminal is allowed to perform retransmission. In this way, the terminal is allowed to decrease the transmit power at costs of some data transmission failures. Therefore, increasing the quantity of the uplink HARQ retransmission times by the third preset value may decrease the transmit power of the terminal by the specified value, to achieve an objective of decreasing the SAR.

Manner 4: The terminal decreases a total quantity of connections to the network device during soft handover by the fourth preset value. When performing the soft handover, the terminal usually needs to establish connections to a plurality of network devices (for example, a plurality of base stations) simultaneously. The terminal usually connects to more than two devices during the soft handover, and sometimes may connect to four or five devices. A larger quantity of network devices connected to the terminal indicates a larger transmit power of the terminal. In this application, the terminal decreases the total quantity of the connections to the network devices during the soft handover, to decrease the transmit power of the terminal and achieve an objective of decreasing the SAR.

Manner 5: The terminal decreases a codec (coding decoding, codec) data rate of a voice connection by the fifth preset value. Quality of the voice communication is related to the codec data rate of the voice connection. A higher codec data rate indicates a better voice quality, and requires a larger transmit power. For example, in a narrowband and broadband adaptive multi-data rate system, a data rate of a voice codec ranges from 4.75 kbps to 23.85 kbps. In this application, the terminal decreases the codec data rate by the fifth preset value, to decrease the transmit power of the terminal by the specified value, and achieve an objective of decreasing the SAR.

According to the method, the terminal can flexibly select an implementation to decrease the transmit power, the flexibility is comparatively high, and the terminal decreases the transmit power of the terminal by the specified value, to accurately adjust the SAR value.

Based on a same inventive concept as the method embodiment, an embodiment of this application further provides a device for decreasing an electromagnetic radiation specific absorption rate. It may be understood that, to implement the foregoing functions, the device includes corresponding hardware structures and/or software modules for executing the functions. A person skilled in the art should easily be aware that, in combination with the examples described in the embodiments disclosed in this specification, algorithm steps may be implemented by hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application.

Figure 6:
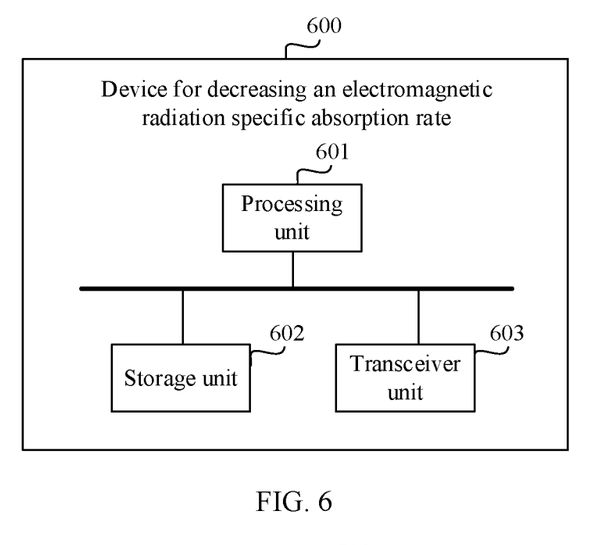
FIG. 6 is a schematic diagram of a device for decreasing an electromagnetic radiation specific absorption rate according to this application.

When an integrated unit is used, FIG. 6 is a possible schematic structural diagram of a device for decreasing an electromagnetic radiation specific absorption rate according to an embodiment of this application. As shown in FIG. 6, the device 600 for decreasing the electromagnetic radiation specific absorption rate includes a processing unit 601, a storage unit 602, and a transceiver unit 603. The processing unit 601 is configured to control and manage an action of the device 600. For example, the processing unit 601 may be configured to perform a technical process such as step S101 to step S104 in FIG. 3, and may further perform a technical process such as step S201 to step S207 in FIG. 5. The transceiver unit 603 is configured to support the device 600 in communicating with another network entity. The device 600 may further include the storage unit 602, configured to store program code and data of the device 600.

The processing unit 601 may be a processor or a controller, such as a general-purpose central processing unit (central processing unit, CPU), a general-purpose processor, a digital signal processing (digital signal processing, DSP), an application-specific integrated circuit (application specific integrated circuits, ASIC), a field programmable gate array (field programmable gate array, FPGA), or another programmable logic device, a transistor logic device, a hardware component, or any combination thereof. The controller/processor may implement or execute various example logical blocks, modules, and circuits described with reference to content disclosed in the present invention. Alternatively, the processor may be a combination implementing a computing function, for example, a combination of one or more microprocessors, or a combination of the DSP and a microprocessor. The transceiver unit 603 may be a radio frequency chip, a radio frequency circuit, or the like. The storage unit 602 may be a memory, may be a RAM (random-access memory, random-access memory), a ROM (read-only memory, read-only memory), or the like.

Figure 7:
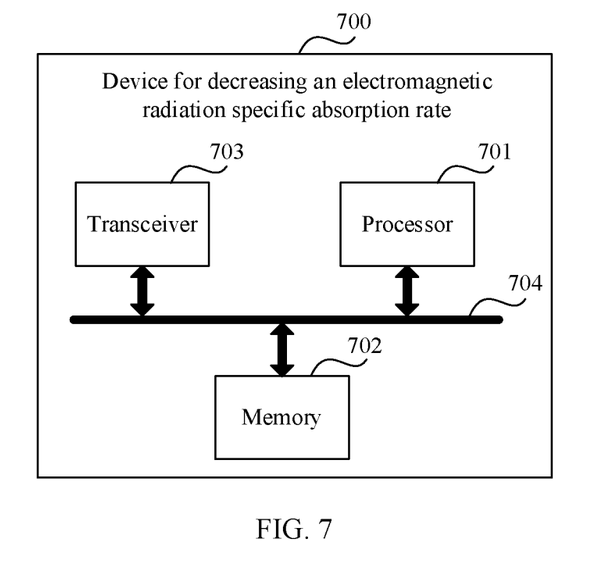
FIG. 7 is a schematic diagram of another device for decreasing an electromagnetic radiation specific absorption rate according to this application.

When the processing unit 601 is the processor, the transceiver unit 603 is a transceiver, and the storage unit 602 is the memory, the device 600 in this embodiment of the present invention may be a device shown in FIG. 7.

FIG. 7 is a schematic diagram of a possible logical structure of the device in the foregoing embodiment according to an embodiment of this application. As shown in FIG. 7, the device 700 may include at least one processor 701. In this embodiment of this application, the processor 701 is configured to control and manage an action of the device. Optionally, the device may further include a memory 702 and a transceiver 703. The processor 701, the memory 702, and the transceiver 703 may be connected to each other, or may be connected to each other by using a bus 704. The memory 702 is configured to store code and data of the device. The transceiver 703 is configured to support the device in communicating with another network device.

The following specifically describes components of the device.

The processor 701 is a control center of the device, and may be one processor, or may be a collective name of a plurality of processing elements. For example, the processor 701 may be a CPU, may be implemented in an ASIC manner, or one or more integrated circuits configured to implement this embodiment of the present invention, for example, one or more DSPs, or one or more FPGAs.

The processor 701 may run or execute a software program stored in the memory 702 and invoke data stored in the memory 702, to execute various functions of the device 700.

The memory 702 may be a read-only memory (read-only memory, ROM) or another type of static storage device that can store static information and an instruction, or a random access memory (random access memory, RAM) or another type of dynamic storage device that can store information and an instruction, or may be an electrically erasable programmable read-only memory (Electrically Erasable Programmable Read-Only Memory, EEPROM), a compact disc read-only memory (Compact Disc Read-Only Memory, CD-ROM) or another compact disc storage, or an optical disc storage (including a compressed optical disc, a laser disc, an optical disc, a digital versatile disc, a Blu-ray disc, or the like), a magnetic disk storage medium or another magnetic storage device, or any other medium that can be used to carry or store expected program code in a form of an instruction or a data structure and that can be accessed by a computer. This is not limited. The memory 702 may exist independently, and is connected to the processor 701 by using a communications bus 704. Alternatively, the memory 702 may be integrated with the processor 701.

The transceiver 703 is configured to communicate with another node, for example, a network device. The transceiver 703 may be further configured to communicate with a communications network, such as the Ethernet, a radio access network (radio access network, RAN), or a wireless local area network (wireless local area networks, WLAN).

The communications bus 704 may be an industry standard architecture (Industry Standard Architecture, ISA) bus, a peripheral component interconnect (Peripheral Component, PCI) bus, an extended industry standard architecture (Extended Industry Standard Architecture, EISA) bus, or the like. The bus may be classified into an address bus, a data bus, a control bus, or the like. For ease of representation, only one thick line is used to represent the bus in FIG. 7, but this does not mean that there is only one bus or only one type of bus.

The device structure shown in FIG. 7 does not constitute a limitation on a device for decreasing an electromagnetic radiation specific absorption rate, and the device may include more or fewer components than those shown in the figure, or combine some components, or have different component arrangements.

In the device 700 shown in FIG. 7, the processor 701 invokes and executes the computer program stored in the memory 702, and may complete a specific process of each embodiment in the foregoing method embodiments by using the transceiver 703. Details are not described herein one by one.

Based on a same concept as the foregoing method embodiments, an embodiment of this application further provides a computer storage medium. The computer storage medium stores a computer-executable instruction. When the computer-executable instruction is invoked by a computer, the computer is enabled to perform a specific process of each embodiment in the foregoing provided method embodiments. In this embodiment of this application, the computer-readable storage medium is not limited. For example, the computer-readable storage medium may be a RAM (random-access memory, random access memory) or a ROM (read-only memory, read-only memory).

Based on a same concept as the foregoing method embodiments, an embodiment of this application further provides a computer program product. The computer program product stores an instruction. When the instruction is run on a computer, the computer is enabled to perform the method provided in any one of the foregoing possible designs.

A person skilled in the art should understand that the embodiments of this application may be provided as a method, a system, or a computer program product. Therefore, this application may use a form of hardware only embodiments, software only embodiments, or embodiments with a combination of software and hardware. Moreover, this application may use a form of a computer program product that is implemented on one or more computer-usable storage media (including but not limited to a disk memory, a CD-ROM, an optical memory, and the like) that include computer-usable program code.

This application is described with reference to the flowcharts and/or block diagrams of the method, the device (system), and the computer program product according to the embodiments of this application. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may be stored in a computer-readable memory that can instruct the computer or any other programmable data processing device to work in a specific manner, so that the instructions stored in the computer-readable memory generate an artifact that includes an instruction apparatus. The instruction apparatus implements a specific function in one or more processes in the flowcharts and/or in one or more blocks in the block diagrams.

These computer program instructions may be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

Although some possible embodiments of this application have been described, a person skilled in the art can make changes and modifications to these embodiments once they learn the basic inventive concept. Therefore, the following claims are intended to be construed as to cover the embodiments of this application and all changes and modifications falling within the scope of this application.

Obviously, a person skilled in the art can make various modifications and variations to this application without departing from the spirit and scope of this application. This application is intended to cover these modifications and variations of this application provided that they fall within the scope of protection defined by the following claims and their equivalent technologies.

What is claimed is:

1. A method implemented by a terminal, wherein the method comprises:
   separately collecting a transmit power of the terminal at different time points during a second duration after a first duration from a power-on moment to obtain a plurality of transmit powers;
   calculating an average transmit power of the transmit powers;
   determining, based on the average transmit power, an electromagnetic radiation specific absorption rate (SAR) corresponding to the average transmit power;
   determining that the electromagnetic radiation SAR is greater than a preset threshold; and
   decreasing the transmit power after the second duration in response to determining that the electromagnetic radiation SAR is greater than the preset threshold.

2. The method of claim 1, further comprising disabling a broadband WI-FI function.

3. The method of claim 1, further comprising forbidding establishing a new Radio Resource Control (RRC) connection or an application communication connection, wherein the application communication connection indicates a communication connection performed using an application program, and wherein the application communication connection comprises an application voice connection, an application data connection, and an application video connection.

4. The method of claim 1, further comprising forming a beam that points away from a human body by controlling a phased-array antenna of the terminal.

5. The method of claim 1, further comprising transmitting a signal using an antenna that is away from a human body and that is one of a plurality of antennas installed on the terminal.

6. The method of claim 1, further comprising:
   calculating a difference between the preset threshold and the electromagnetic radiation SAR;
   determining, based on the difference, a specified value to decrease the transmit power after the second duration; and
   decreasing the transmit power after the second duration by the specified value.

7. The method of claim 6, further comprising:
   decreasing a maximum transmit power of a physical random-access channel (PRACH) by a first preset value;
   decreasing a power headroom reported to a network by a second preset value;
   increasing a quantity of uplink hybrid automatic repeat request (HARQ) times by a third preset value;
   decreasing a total quantity of connections to a network device during soft handover by a fourth preset value; or
   decreasing a codec data rate of a voice connection by a fifth preset value.

8. The method of claim 1, further comprising:
   obtaining one-to-one correspondences between a plurality of average transmit powers and a plurality of electromagnetic radiation SARs; and
   determining, from the one-to-one correspondences and the average transmit power, the electromagnetic radiation SAR corresponding to the average transmit power.

9. The method of claim 8, further comprising:
   obtaining the one-to-one correspondences between the average transmit powers and the electromagnetic radiation SARs from a local storage of the terminal; or
   receiving the one-to-one correspondences from a network device.

10. The method of claim 1, further comprising entering the terminal in a call state after the first duration.

11. A terminal comprising:
    a transceiver configured to wirelessly receive and transmit a signal; and
    a processor coupled to the transceiver and configured to:
      separately collect, at different time points during a second duration after a first duration from a power-on moment of the terminal, a transmit power used by the transceiver to send the signal to obtain a plurality of transmit powers;
      calculate an average transmit power of the transmit powers;
      determine based on the average transmit power, an electromagnetic radiation specific absorption rate (SAR) corresponding to the average transmit power;
      determine that the electromagnetic radiation SAR is greater than a preset threshold; and
      decrease the transmit power after the second duration in response to determining that the electromagnetic radiation SAR is greater than the preset threshold.

12. The terminal of claim 11, wherein the processor is further configured to disable a broadband WI-FI function.

13. The terminal of claim 11, wherein the processor is further configured to forbid establishing a new Radio Resource Control (RRC) connection or an application communication connection, wherein the application communication connection indicates a communication connection performed using an application program, and wherein the application communication connection comprises an application voice connection, an application data connection, and an application video connection.

14. The terminal of claim 11, further comprising a phased-array antenna, wherein the processor is further configured to form a beam that points away from a human body using the phased-array antenna.

15. The terminal of claim 11, further comprising a plurality of antennas, wherein the processor is further configured to transmit a second signal using an antenna that is away from a human body and that is one of the antennas.

16. The terminal of claim 11, wherein the processor is further configured to:
   calculate a difference between the preset threshold and the electromagnetic radiation SAR;
   determine, based on the difference, a specified value to decrease the transmit power after the second duration ; and
   decrease the transmit power after the second duration by the specified value.

17. The terminal of claim 16, wherein the processor is further configured to:
   decrease a maximum transmit power of a physical random-access channel (PRACH) by a first preset value;
   decrease power headroom reported to a network by a second preset value;
   increase a quantity of uplink hybrid automatic repeat request (HARQ) times by a third preset value;
   decrease a total quantity of connections between the transceiver and a network device during soft handover of the terminal by a fourth preset value; or
   decrease a codec data rate of a voice connection of the transceiver by a fifth preset value.

18. The terminal of claim 11, wherein the processor is further configured to:
   obtain one-to-one correspondences between a plurality of average transmit powers and a plurality of electromagnetic radiation SARs; and
   determine, from the one-to-one correspondence and the average transmit power, the electromagnetic radiation SAR corresponding to the average transmit power.

19. The terminal of claim 18, wherein the processor is further configured to:
   obtain the one-to-one correspondences from a local storage of the terminal; or
   receive, using the transceiver, the one-to-one correspondences from a network device.

20. A computer program product comprising computer-executable instructions that are for storage on a non-transitory medium and that, when executed by a processor, cause an apparatus to:
   separately collect a transmit power of the apparatus at different time points during a second duration after a first duration from a power-on moment to obtain a plurality of transmit powers;
   calculate an average transmit power of the transmit powers;
   determine, based on the average transmit power, an electromagnetic radiation specific absorption rate (SAR) corresponding to the average transmit power;
   determine that the electromagnetic radiation SAR is greater than a preset threshold; and
   decrease the transmit power after the second duration in response to determining that the electromagnetic radiation SAR is greater than the preset threshold.

* * * * *